United States Patent [19]

Saitou et al.

[11] Patent Number: 5,320,791

[45] Date of Patent: Jun. 14, 1994

[54] METHOD FOR PREPARING MOLDED ARTICLES OF HIGH-PURITY ALUMINA FIBERS

[75] Inventors: Yoshiaki Saitou; Shigeyuki Date; Shinpei Nonaka; Takashi Shinbo, all of Tochigi; Hiroshi Nakamura, Tokyo, all of Japan

[73] Assignee: Mitsui Mining Company, Limited, Tokyo, Japan

[21] Appl. No.: 874,704

[22] Filed: Apr. 28, 1992

[30] Foreign Application Priority Data

Apr. 30, 1991 [JP] Japan .................................. 3-124389

[51] Int. Cl.$^5$ .............................................. C04B 35/10
[52] U.S. Cl. ......................................... 264/63; 264/66; 264/86; 264/87; 264/177.11; 264/DIG. 19
[58] Field of Search ................... 264/63, 66, DIG. 19, 264/86, 87, 177.11

[56] References Cited

U.S. PATENT DOCUMENTS

| | | | |
|---|---|---|---|
| 3,775,141 | 11/1973 | Weidman | 264/DIG. 19 |
| 3,947,534 | 3/1976 | Mansmann | 264/62 |
| 4,250,131 | 2/1981 | Sobel et al. | 264/56 |
| 4,401,613 | 8/1983 | Adell | 264/86 |
| 4,801,562 | 1/1989 | Sowman et al. | 501/35 |
| 4,812,271 | 3/1989 | Koba et al. | 264/63 |
| 4,929,578 | 5/1990 | Sowman | 501/95 |
| 4,935,178 | 6/1990 | Esposito et al. | 264/87 |
| 5,002,750 | 3/1991 | Kadokura et al. | 423/625 |

FOREIGN PATENT DOCUMENTS

| | | |
|---|---|---|
| 0168717 | 1/1986 | European Pat. Off. |
| 0283176 | 3/1988 | European Pat. Off. |
| 0260868 | 9/1988 | European Pat. Off. |
| 0368370 | 5/1990 | European Pat. Off. |
| 2088130 | 1/1972 | France |
| 2229786 | 5/1974 | France |
| 57-27210 | 6/1982 | Japan |
| 59-152281 | 8/1984 | Japan |
| 61-141683 | 6/1986 | Japan |
| 63-75117 | 4/1988 | Japan |
| 64-42373 | 2/1989 | Japan |
| 2-25873 | 6/1990 | Japan |
| 2-234963 | 9/1990 | Japan |

OTHER PUBLICATIONS

Patent Abstracts of Japan, vol. 143, (C-521), first abstract (Aug. 16, 1988).
Patent Abstracts of Japan, vol. 14, No. 548 (C-785), (Dec. 5, 1990).

Primary Examiner—James Derrington
Attorney, Agent, or Firm—Fisher, Christen & Sabol

[57] ABSTRACT

Molded articles of high-purity alumina fibers, which are porous materials in which heat resistance is high, and in particular, deformation and linear shrinkage in heat cycles at a temperature more than 1700° C. are small. The production method comprising spinning a spinning solution containing an alumina fiber precursor as the main component to obtain precursor fibers, prefiring these precursor fibers at 400° to 1000° C. to form prefired fibers, and then molding and calcining these prefired fibers. Sintering between the fibers can be achieved at a relatively low temperature. In particular, even when no inorganic binder component is added, the molded articles of high-purity alumina fibers can be obtained by a simple process.

7 Claims, No Drawings

METHOD FOR PREPARING MOLDED ARTICLES OF HIGH-PURITY ALUMINA FIBERS

BACKGROUND OF THE INVENTION (i) Field of the Invention

The present invention relates to a method for preparing molded articles of high-purity alumina fibers having high heat resistance which are suitable for high-temperature insulating materials, catalyst carriers and the like.

(ii) Description of the Prior Art

Alumina fibers are materials having high strength and excellent heat resistance, and they are used in a cotton-like state or in the form of molded articles. In particular, molded articles obtained by molding the alumina fibers together with various binder components and matrix components have small bulk density and so they are lightweight. In addition, they have a large insulating effect, and therefore they are suitable for high-temperature insulating materials.

As a method for preparing the molded articles of these alumina fibers, there are known methods which comprise cutting alumina, alumina-silica or alumina-silicaboron oxide ceramic fibers into a suitable length; adding an inorganic binder such as silica fibers, an alumina sol or a silica sol, or an organic binder thereto; and then molding and drying the mixture (e.g., Japanese Patent Application Laid-open Nos. 59-152281, 61-141683 and 64-42373, and other publications). When the molded articles manufactured by these known methods are used at a high temperature, they are to be calcined at a suitable temperature to carry out a binder removal treatment, prior to their use. In short, the above-mentioned known techniques require the employment of the calcined fibers as the raw material to obtain desired strength, heat resistance and the like as well as the binder to supplement the sintering properties of the fibers as an essential component.

However, in the molded articles of alumina, aluminasilica or alumina-silica-boron oxide ceramic fibers prepared by these methods, cracks easily occur as a result of heat shrinkage, when the ceramic fibers calcined at a temperature of 1000° C. or less are used, and therefore they have the substantial problem of heat resistance. On the other hand, when the fibers are obtained by the calcination at 1000° C. or more, a large amount of energy is consumed. When an alumina content is low, heat resistance, strength and the like cannot be improved, and therefore, in such a case, raw materials are limited. Furthermore, when alumina fibers obtained by the calcination at a temperature of 1000° C. or more are used as the raw material, the molded articles of the high-purity alumina fibers can be obtained However, the sintering properties of the fibers themselves are poor, and therefore even if the binder is added thereto, sintering between the fibers is insufficient. In consequence, even if the strength of the fibers is sufficient, the molded articles obtained therefrom have low strength, and crystallization of the fibers, when used, proceeds at a high temperature, so that the fibers tend to fall from the surfaces of the molded articles.

Moreover, another method has been suggested in which precursor fibers of alumina, silica, zirconia or the like are molded and then calcined to obtain a fibrous refractory having high strength. In this case, the consumption of energy can be decreased at the time of the manufacture (Japanese Patent Publication No. 25873/1990). However, in this method, the precursor fibers before the molding adhere to each other during storage, so that it is difficult to disperse them in a fibrous state in a solvent when they are molded. This fact makes it difficult to stably manufacture the uniformly molded articles having high strength at times. In addition, this kind of precursor fibers noticeably shrink at the time of calcination, and therefore they have the problem that the molded articles obtained therefrom are likely to crack.

The problems of the above mentioend technology can be summarized as follows: When the fibers calcined at 1000° C. or more are used as the raw material, sufficient heat resistance and strength cannot be obtained, unless the alumina has a high purity. On the other hand, when the high-purity alumina is used, the sintering properties are insufficient, so that strength deteriorates and the fibers tend to peel from the surfaces of the molded articles. Furthermore, since the fibers calcined at 1000° C. or more are used, a large amount of energy is consumed during the manufacture. Moreover, when the precursor fibers are used as the raw material, it is possible to obtain the molded articles having excellent strength and heat resistance under the small energy consumption. However, it is not easy to handle the precursor fibers, and these precursor fibers adhere to each other during storage and the molded articles cannot be obtained on occasion.

In view of the above mentioned situations of the conventional techniques, an object of the present invention is to provide a method for stably preparing molded articles of high-purity alumina fibers which are lightweight and have high strength and excellent heat resistance. The above-mentioned molded articles are extremely useful as high-temperature insulating materials, base materials for various composite materials, catalyst carriers and the like.

SUMMARY OF THE INVENTION

The present inventors have intensively investigated in order to achieve the above-mentioned object. As result, they have found that molded articles of high-purity alumina fibers can be obtained by molding and then calcining specific prefired fibers formed in the manufacturing process of the high-purity alumina fibers, thereby completing the present invention. In the present invention, the so-called precursor fibers are used, but they are modified into the prefired fibers prior to molding. Thus, the fibrous state can be maintained, and the same effect can be obtained in points of heat resistance, strength and the like as in the case of when the alumina fibers are used as the raw material. In addition, since the prefired fibers are used, problems of peeling, cracks and the like which are attributable to the employment of the calcined fibers do not occur any more.

That is, the present invention is directed to a method for preparing molded articles of high-purity alumina fibers which includes the steps of spinning a spinning solution which is mainly comprised of a high-purity alumina fiber precursor to form precursor fibers, prefiring these precursor fibers at a low temperature to form prefired fibers, adding a binder component and/or a molding auxiliary, if necessary, molding the mixture, and then calcining the resultant molded articles of the prefired fibers. The "high-purity" means that 95% or more of alumina is contained in terms of the weight of the total oxides in the calcined fibers. When the purity is lower than this level, chemical stability is poor, and the object of the present invention cannot be achieved. In this connection, the components which do not constitute the fibers are not included in the above-mentioned total oxides in the calcined fibers. For example, the molded articles for functional composite materials contain catalytically active components and the like other than the fibers, but such components other than the fibers are not included in the weight base of the total oxides in the calcined fibers. The alumina purity is determined in terms of the weight of the total oxides in the calcined fibers.

According to the method of the present invention, the alumina fibers in the state of the prefired fibers are molded and then calcined, and therefore sintering activity between the fibers is higher as compared with a product obtained by a conventional method which comprises mixing alumina fibers calcined at 1000° C. or more with a binder component, and then molding and calcining the mixture. Therefore, any inorganic binder does not have to be added, if not particularly required to adjust density and strength. Hence, the present invention can provide the molded articles of the high-purity alumina fibers having practical strength. The method of the present invention permits omitting the step in which the fibers as the raw material are sintered at 1000° C. or more. The prefired fibers have better dispersibility in a solvent at the time of the molding as compared with the fibers calcined at 1000° C. or more, and the shrinkage of the prefired fibers at the time of the calcination is smaller as compared with that of the fibers obtained by the method using the precursor fibers, so that dimensional adjustment is conveniently easy. The present invention permit remarkable simplifying of the manufacturing process. In the case of where the fibers which have been calcined at 1000° C. or more are used, the calcination must be carried out at a higher temperature than the calcination temperature of the fibers, but when the prefired fibers are used, sintering can be started from a relatively low temperature. Therefore, the crystallinity of alumina in the molded articles can be adjusted in compliance with their use by suitably selecting calcination conditions from a wider range than when the calcined fibers are used.

On the other hand, the prefired fibers have better storage stability and higher flexibility and they are easier to handle, as compared with the precursor fibers in the conventional method. In addition, the shrinkage ratio of the molded articles of the obtained prefired fibers at the time of the calcination is lower and so the shape stability of the molded articles is superior as compared with the precursor fibers. Therefore, the prefired fibers permits obtaining the molded articles having a larger size and a more complex shape than the precursor fibers.

The molded articles of the alumina fibers which can be obtained by the method of the present invention have high strength and high heat resistance. More specifically, these molded articles are porous, and thus their deformation and linear shrinkage which occur in heat cycles at a temperature of more than 1700° C. are small, and hence they can be continuously used at a high temperature of about 1850° C. and are suitable for high-temperature refractory insulating materials and catalyst carriers which will be used at high temperatures.

DETAILED DESCRIPTION AND THE PREFERRED EMBODIMENTS

Now, a method of the present invention will be described in detail.

In the method of the present invention, precursor fibers of high-purity alumina fibers are first formed, and they are then prefired to obtain prefired fibers. The "precursor fibers" means fibers produced by spinning a spinning solution mainly comprised of precursors of the high-purity alumina fibers. No particular restriction is put on the process of obtaining the precursor fibers, and an inorganic salt spinning process may be acceptable, but a slurry spinning process is suitable by which the high-purity precursor fibers can be obtained (Japanese Patent Publication No. 27210/1982 and Japanese Patent Application Laid-open No. 75117/1988).

Now, the method of the present invention will be described in detail in accordance with the slurry spinning process. First 10 to 40% by weight of an alumina powder or an aluminum compound powder having an average particle diameter of 0.1 $\mu$m or less which will become alumina by calcination, in terms of the total oxides weight in calcined fibers (hereinafter referred to as "in terms of the oxides"), 4 to 10% by weight of a spinning auxiliary and, if necessary, 3% by weight or less of a sintering auxiliary in terms of the oxides are added to and mixed with an aqueous solvent solution such as an aqueous solution of a basic aluminum salt or a mixed solvent of water and an aqueous solvent of an alcohol or the like to form a slurry which is a spinning solution. This spinning solution is then spun and then dried to obtain the precursor fibers.

In general, the viscosity of the spinning solution is from about 1000 to about 10000 cp, and a spinning rate is from about 5 to about 200 m/minute.

Examples of the basic aluminum salt which is used in the present invention include basic aluminum chloride, basic aluminum nitrate, basic aluminum acetate and basic aluminum chloroacetate. As a powder which can be added for the purposes of improving the fluidity of the spinning material, inhibiting volatilization at the time of the prefiring and the sintering, and improving the strength of the fibers, alumina and aluminum compounds such as boehmite, bayerite, diaspore and pseudoboehmite which will become alumina by can be used. Furthermore, as the spinning auxiliary for improving the stringing properties of the spinning material, organic compounds such as ethylene glycol, glycerin and acetic acid, water-soluble organic polymers such as polyvinyl alcohol, polyethylene oxide and polypropylene oxide; and mixtures thereof can be used. The amount of the spinning auxiliary is from 0.1 to 10% by weight in terms of the oxides. In addition, preferable examples of the sintering auxiliary include oxides such as CuO, MgO, $ZrO_2$, PbO, $Cr_2O_3$, $Fe_2O_3$, $MoO_3$ and $TiO_2$, and compounds, which will become the oxides, such as $CuSO_4$, $MgCl_2$ and $ZrCl_2$.

The thus obtained precursor fibers have a fiber diameter of from about 5 to about 200 $\mu$m, preferably from about 10 to about 50 $\mu$m, and they are "high-purity" in terms of the oxide. When the fiber diameter of the precursor fibers is less than 5 $\mu$m, a thread tends to be cut at the time of the spinning, and conversely when it is more than 200 $\mu$m, the precursor fibers are likely to be non-uniformly dried in the dry step. Thus, in such instance it is difficult to control the process, and the strength of the fibers also deteriorates. From the viewpoint of spinning efficiency, it is proper that the fiber diameter of the precursor fibers is from 5 to 200 μm. Next, the precursor fibers are prefired at a relatively low temperature of 400° to 1000° C. in an oxidizing atmosphere such as air, thereby obtaining prefired fibers. The term "prefired fibers" means fibers which can be formed by prefiring the precursor fibers at 400° to 1000° C. and which can maintain the shape of the fibers when dispersed in the solvent at the time of the manufacture of the molded articles, can prevent the fibers from adhering to each other, and can be sintered by calcination at a temperature of 1000° C. or higher than the prefiring temperature. It is not apparent how the prefired fibers are defined organically, but the following differences of characteristics are present among the precursor, the prefired fibers and the calcined fibers

|  | Precursor | Prefired Fibers | Calcined Fibers |
| --- | --- | --- | --- |
| Stability to Water | easily soluble | not soluble (hygroscopic) | not soluble |
| Decreased Weight by Strong Heat (at 1000° C.) | 50–60 wt % | 1–20 wt % | 0 |
| Crystalline Structure by X-rays | amorphous | amorphous | α-Al$_2$O$_3$ |
| Sintering Activity | present | present | absent |

Here, "decreased weight by strong heat" means decreased weight by heating at 1000° C. for 1 hour.

The prefired fibers can usually has obtained in a step on the upstream side of the final calcination ste in the manufacturing process of the high-purity alumina fibers, i.e., the precursor formation→prefiring→calcination (1000° C. or more). Therefore, the prefired fibers themselves are not novel, but the conventional known prefired fibers are merely an intermediate obtained by calcination as a pretreatment to prevent the abrupt calcination. Thus, it has not been considered at all that the prefired fibers are employed for an independent application.

The spinning is usually carried out through a spinneret having a plurality of spinning holes, and therefore the precursor fibers and the prefired fibers are handled in the form of multifilament yarns each comprising a bundle of about 20 to about 10000 filaments.

Since the alumina fibers are molded in the state of the prefired fibers and then calcined, sintering activity is high between the fibers, in contrast to the conventional method which comprises mixing the alumina fibers calcined at 1000° C. or more with a binder component, and then molding/calcining the mixture. Therefore, according to the present invention, the molded articles of the high-purity alumina fibers which have practical strength can be obtained without adding any inorganic binder, if not particularly required to adjust density, strength and the like. Suitably, the prefiring temperature can be selected in the above-mentioned temperature range in view of the state of the above-mentioned precursor fibers, the treatment conditions in the molding step, the molding auxiliary to be added, the state and the blend ratio of the binder component, and the state of the desired molded articles. However, when the prefiring temperature is less than 400° C., the fibers are likely to adhere to each other during the prefiring treatment, and conversely when it is more than 1000° C., the fibers are excessively sintered and so as a result the sintering activity of the prefired fibers deteriorates, so that the strength of the molded articles cannot be obtained unpreferably. The more preferable prefiring temperature is in the range of from 500° to 800° C. In this connection, the prefiring time is usually in the range of from 1 to 120 minutes. Even if the prefiring time is too long, the improvement of the functional effect cannot be perceived. If a material calcined at 1000° C. or more is used as the material of the molded articles, it is poor in dispersibility in a solvent such as water (in contrast, the prefired fibers are easily composed). On the other hand, if the precursor fibers are used and more specifically they are molded by the slurry process, the water-soluble components in the precursor are dissolved out and the fibrous morphology can no longer be maintained. For this reason, water cannot be used. Furthermore, the precursor fibers shrink noticeably in the calcination step, and therefore dimensional adjustment is difficult. In consequence, in both the cases of the calcined material and the precursor fibers, the control of the process is difficult.

In the method of the present invention in which the prefired fibers are used, the calcined fibers themselves are not employed, and therefore the step where the fibers before the molding are sintered at 1000° C. or more can be omitted. In addition, the dispersibility of the prefired fibers in the solvent at the time of the molding is better and the prefired fibers are easier to mold, as compared with the fibers calcined at 1000° C. or more. Moreover, in the method of the present invention, the shrinkage of the prefired fibers is smaller and the dimensional adjustment is easier than in the method which was the precursor fibers. Thus, the present invention, demonstration how the process can be remarkably simplified.

The thus obtained prefired fibers are cut into a length of from 0.1 to 30 mm (a fiher diameter is from about 4 to about 160 μm), and then molded to obtain the molded articles of the prefired fibers. The length of the prefired fibers can be determined in compliance with their application. The fiber length may be adjusted by cutting the prefired fibers, but the precursor fibers may be cut and then prefired. The prefired fibers which have the thus adjusted length are dispersed in a solvent about 20 to 200 times by weight as much as the amount of the prefired fibers, and if necessary, the molding auxiliary and the binder component can be added thereto. Afterward, the excessive solvent is removed from the resultant slurry by a method such as filtration or evaporation so that the slurry may be moldable, followed by molding the moldable slurry and drying it to obtain the molded articles of prefired fibers. Preferaly, the removal of the solvent and the molding are simultaneously conducted in such a way that the slurry is introduced into a mold of a desired shape having a filter and formed into the desired shape while discharging the solvent under reduced pressure or increased pressure. In order to make a finer structure, it is preferable to use a pressure of, for example, approximately 1–6 KPa during the molding process. When dispersed in the solvent, the prefired fibers having the form of the multi-filament yarns become loose and take on a substantially uniform dispersion state. The molding auxiliary and the binder component may be added after the removal of the excessive solvent by vacuum molding or filtration. In the present invention, the prefired fibers have sufficient sintering activity, and so the addition of the binder component, particularly the inorganic binder component is not essential any longer. This method is in contrast to the conventional techniques in which the binder is necessary for obtaining the molded articles.

Furthermore, the prefired fibers have better storage stability and higher flexibility and are easier to handle, as compared with the precursor fibers in the conventional method. In addition, the shrinkage ratio of the molded articles of the obtained prefired fibers at the time of calcination is lower and thus, the shape stability of the molded articles is superoir as compared with the precursor fibers. Therefore, the prefired fibers permit the obtaining of molded articles having a larger size and a more complex shape than the precursor fibers.

The molded articles of the prefired fibers can take an optional shape such as sheet, board, column, cylinder or honeycomb by removing the solvent in a suitable mold or by cutting the molded articles after the molding.

As the solvent which can be used in the present invention, water is optimum from the viewpoint of being easy to handle. However, in view of a kind of selected alumina fiber precursor, that is, a kind of selected basic aluminum salt, a kind of aluminum compound for improving the strength and a kind of spinning auxiliary, and considering dispersibility and volatility, organic solvent, can be used for example, an alcohol solvent such as methanol, ethanol and diethylene glycol, an aromatic solvent such as benzene or toluene, a ketone solvent such as acetone or methyl ethyl ketone, a mixed solvent thereof, or a mixed solvent of water and the above-mentioned organic solvent.

The molding auxiliary which is used, if necessary, in the molding step has an effect of improving moldability and physical properties of the molded articles. Examples of the molding auxiliary include water soluble organic compounds such as polyvinyl alcohol, polyvinyl methyl ether, polyacrylamide, polyethylene glycol, polyvinylpyrrolidone, glycerine, starch, cellulose acetate, methyl cellulose, carboxymethyl cellulose and alginic acid. The amount of the molding auxiliary is preferably 20% by weight or less in terms of the oxides. For the purpose of further strengthening the sintering between the fibers, the binder component may be added in an amount of 10% or less in terms of the oxides. Preferable examples of the binder component include aluminum compounds such as aluminum chloride, aluminum phosphate, aluminum nitrate, aluminum sulfate, aluminum diacetate hydroxide, aluminum iodide and aluminum ammonium sulfate. If the alumina fiber precursor used to form the precursor fibers is employed as the binder component, affinity for the fibers is improved and the uniform molded articles can be obtained. Furthermore, the molded articles in which the randomly oriented alumina fibers are maintained in the solution can be obtained by adding a gelatinizing agent such as agar, gelatin or a metallic alkoxide compound to the slurry of the prefired fibers, treating the mixture under gelation conditions for the selected gelatinizing agent to gel and solidify the slurry, drying, and then sintering the same.

The thus obtained molded articles of the prefire fibers are then calcined at a temperature higher than in the prefiring step, i.e., at a temperature of 1000° to 1900° C. to obtain the molded articles of the high-purity alumina fibers. When the calcination temperature is less than 1000° C., the sintering is insufficient, and conversely when it is more than 1900° C., it is difficult at times to maintain the shape of the molded articles. The calcination time is suitably determined, taking the size and shape of the molded articles into consideration In the case of the conventional technique in which the fibers calcined at 1000° C. or more are used, the fibers must be calcined at a temperature higher than the calcination temperature of the fibers. On the contrary, in the case that the prefired fibers are used, sintering can be started from a relatively low temperature, and therefore the crystallinity of alumina in the molded articles can be adjusted in compliance with their use by suitably selecting calcination conditions.

If the organic components remain in the molded articles of the prefired fibers and if a temperature rise rate at the time of the calcination is too high, the organic components are abruptly decomposed and fired, so that cracks occur in the molded articles and the sintering does not smoothly proceed between the fibers. As a result, the strength of the molded articles is likely to deteriorate. Therefore, the temperature rise rate at the calcination is preferably 200° C./hour or less. In particular, when the temperature ranges from room temperature to about 1000° C. at which the decomposition, elimination, combustion and the like progress, the temperature rise rate is preferably selected in the rahge of from 50° to 100° C./hour. Furthermore, when the temperature ranges from about 1000° to about 1250° C. at which the crystallization of amorphous alumina and the initial sintering progress, the temperature rise rate is preferably high, because if so, abnormal growth of particles at a higher temperature in the subsequent sintering step can be inhibited, so that the strength of the calcined articles increases and the stability of the shape is likely to increase. Accordingly, the temperature rise rate is preferably from 150° to 200° C./hour, more preferably from 180° to 200° C./hour. Moreover, when temperatures of about 1250° C. or more are employed at which the growth of the crystalline particles and the sintering progress, the temperature rise rate is preferably low, because if so, there is the tendency that bulk density increase, porosity decreases and compressive strength and bending strength increase. Accordingly, the temperature rise rate is preferably from 25° to 100° C./hour. The above-mentioned heat pattern is a typical pattern, and the suitable heat pattern can be taken in accordance with the composition of the molded articles of the prefired fiber and the like.

In the molded articles of the high-purity alumina fibers which can be obtained by the method of the present invention, an alumina purity is 95% or more, and in a preferable embodiment, the molded articles comprise 99% or more of an $\alpha$-alumina system. In order to obtain these molded articles, the molding and calcination are carried out when the fibers are in the state of the prefired fibers, and therefore, the adhesion between the fibers is strong and compressive strength is from 5 to 80 kg/cm$^2$; a bulk density is as low as 0.05 to 1.0 g/cm$^3$; the porous state is fine and uniform and a porosity is from 75 to 98%; and heat resistance is so high as to withstand a temperature of 1900° C. or so.

Particularly, these molded articles are porous, and so the deformation and linear shrinkage which occur in heat cycles at a temperature more than 1700° C. are small, and hence they can be continuously used at a high temperature of about 1750°–1870° C. and are suitable for high-temperature insulating materials, catalyst carriers and the like which will be used at high temperatures. The above-mentioned temperature at which they can be continuously used corresponds to the heat resistance throughout the heat cycle. It represents the upper limit of temperature at which the linear shrinkage ratio is not in excess of 1%, measured after a sample has been maintained at a predetermined temperature for four hours and then cooled. Furthermore, in the molded articles which can be obtained by the use of the gelatinizing agent, the fibers are not particularly oriented, and so they are characterized by being mechanically, thermally and electrically isotropic. Moreover, the molded articles of the high-purity alumina fibers can be cut into an optional shape, and the surfaces of these molded articles are allowed to contain a substance capable of emitting infrared rays having a specific wave length. A coating material having a specific color such as black can be also applied onto the surfaces of the molded articles to improve the insulating effect and the heat reflecting efficiency. In addition, when a functional additive such as a catalyst activating component is used, various kinds of functional composite materials can be utilized as the base materials.

Now, the present invention will be described in more detail in reference to examples.

EXMAPLE 1

4.2 parts by weight of aluminum chloride, 46.7 parts by weight of anhydrous basic aluminum chloride, 10.2 parts by weight of γ-alumina powder having an average particle diameter of 0.02 μm, and 0.43 part of magnesium chloride were dissolved and dispersed in 34 parts by weight of water, and 4.5 parts by weight of polyethylene oxide (its average molecular weight about 1,000,000) were added to the resultant slurry, followed by enough mixing, to obtain a spinning solution.

This spinning solution was then spun through a spinneret having 1000 spinning holes to obtain a continuous precursor fiber comprising a bundle of 1000 filaments each having a fiber diameter of 20 μm. This continuous precursor fiber was continuously passed through an electric furnace at a maximum temperature of 900° C. so that a residence time therein might be 1 minute, thereby obtaining a prefired fiber.

This prefired fiber was cut into a length of 1.0 mm, and 400 g of the thus cut prefired fibers were dispersed in 20 liters of water, followed by filtration and vacuum molding. After the vacuum-molding, 1 liter of a 1% aqueous polyvinyl alcohol solution was infiltrated to the molded article, and then it was dried at 105° C. for 24 hours to obtain a 250 mm × 250 mm × 20 mm molded article of the prefired fibers. This molded article of the prefired fibers was heated up to 1100° C. at the temperature rise rate of 100° C./hour, and then heated up to 1450° C. at the temperature rise rate of 50° C./hour. Afterward, it was heated at the same temperature for 4 hours to sinter it. The thus molded article was composed of an α-alumina system having an alumina purity of 99.5%. It was porous and had a compressive strength of 15 kg/cm², a bulk density of 0.40 g/cm³ and a porosity of 89%.

EXAMPLE 2

The same procedure as in Example 1 was used to obtain a molded article of prefired fibers, and it was then calcined, changing a heat pattern. That is, the molded article was heated up to 1000° C. at the temperature rise rate of 100° C./hour, heated up to 1250° C. at the temperature rise rate of 200° C./hour, and further heated up to 1650° C. at the temperature rise rate of 100° C./hour. They were heated at the same temperature for 8 hours to sinter it. The obtained moleded article was composed of an α-alumina system having an alumina purity of 99.5%. It was porous and had a compressive strength of 18 kg/cm², a bulk density of 0.42 g/cm³ and a porosity of 89%.

EXAMPLE 3

The same precursor fiber as formed in Example 1 was cut into a length of 1.5 mm, and 545 g of the cut fibers were then placed in an electric furnace and maintained at the maximum temperature of 500° C. for 1 hour to obtain prefired fibers. These prefired fibers were molded in the same manner as in Exmaple 1, thereby obtianing a 250 mm × 250 mm × 35 mm molded article of the prefired fibers. This molded article of the prefired fibers was heated up to 1000° C. at the temperature rise rate of 100° C./hour, then heated up to 1200° C. at the temperature rise rate of 150° C./hour, and further heated up to 1700° C. at the temperature rise rate of 100° C./hour. They were heated at the same temperature for 4 hours to sinter it. The obtained molded article was composed of an α-alumina system having an alumina purity of 99.5%. It was porous and had a compressive strength of 10 kg/cm², a bulk density of 0.28 g/cm³ and a porosity of 92%.

EXMAPLE 4

The same procedure as in Example 1 was used except that the refiring temperature was 800° C., thereby obtaining prefired fibers having a length of 1.0 mm, and 600 g of these prefired fibers were then filtered and vacuum molded in the same manner as in Example 1. After the vacuum molding, 150 g of the same spinning solution as used in Example 1 which function as a molding auxiliary and a binder component were dispersed in 1.5 liters of water to form a slurry, and the above-mentioned fibers were then impregnated with the slurry, followed by drying at 105° C. for 24 hours to obtain a 250 mm × 250 mm × 35 mm molded article of the prefired fibers. This molded article of the prefired fibers was heated up to 1100° C. at the temperature rise rate of 100° C./hour, and then heated up to 1450° C. at the temperature rise rate of 50° C./hour, and they were further heated at the same temperature for 4 hours to sinter it. The obtained molded article was composed of an α-alumina system having an alumina purity of 99.5%. It was porous and had a compressive strength of 20 kg/cm², a bulk density of 0.35 g/cm³ and a porosity of 90%.

EXAMPLE 5

A 250 mm × 250 mm × 20 mm molded article of the prefired fibers obtained by the same procedure as in Example 4 was heated up to 1000° C. at the temperature rise rate of 50° C./hour, and then heated up to 1450° C. at the temperature rise rate of 25° C./hour. It was additionally heated at the same temperature for 4 hours to sinter it. The obtained molded article was composed of an α-alumina system having an alumina purity of 99.5%. It was porous and had a compressive strength of 50 kg/cm², a bulk density of 0.60 g/cm³ and a porosity of 83%.

EXMPLE 6

A 250 mm × 250 mm × 20 mm molded article of the prefired fibers obtained by the same procedure as in Example 4 was heated up to 1000° C. at the temperature rise rate of 50° C./hour, then heated up to 1300° C. at the temperature rise rate of 180° C./hour, and further heated up to 1680° C. at the temperature rise rate of 25°

C./hour. It was additionally heated at the same temperature for 12 hours to sinter it. The obtained molded article was composed of an α-alumna system having an alumina purity of 99.5%. It was porous and had a compressive strength of 60 kg/cm², a bulk density of 0.65 g/cm³ and a porosity of 82%.

COMPARATIVE EXAMPLE 1

Commercially available alumina fibers (cotton-like state, alumina purity 96 to 97%, and fiber diameter 3 μm) were cut into a length of 5 mm, and 410 g of the cut fibers were then dispersed in 15 liters of water. Afterward, 210 g of polyvinyl alcohol and 3 kg of an alumina sol (alumina content 10 to 11% by weight) were added thereto, followed by filtration and vacuum molding to obtain a 250 mm × 250 mm × 20 mm molded article of the fibers. This molded article was heated up to 1500° C. at the temperature rise rate of 100° C./hour and further heated at the same temperature for 4 hours to sinter it. The obtained sintered article contained 93% of alumina. It was porous and had a compressive strength of 15 kg/cm², a bulk density of 0.35 g/cm³ and a porosity of 91%.

COMPARATIVE EXAMPLE 2

Commercially available alumina fibers (cotton-like state, alumina purity 95%, and fiber diameter 3 μm) were cut into a length of 3.5 mm, and 90 g of the cut fibers were then dispersed in 15 liters of water. Afterward, 150 g of polyvinyl alcohol and 1 kg of colloidal silica (silica content 20% by weight) were added thereto, followed by filtration and vacuum molding to obtain a 100 mm × 100 mm × 70 mm molded article of the fibers. This molded article was heated up to 1600° C. at the temperature rise rate of 200° C./hour and then heated at the same temperature for 4 hours to sinter it. The obtained sintered article was composed of an alumina/mullite system comprising alumina and 64% of mullite. It was porous and had a compressive strength of 19 kg/cm², a bulk density of 0.30 g/cm³ and a porosity of 91%.

COMPARATIVE EXAMPLE 3

Commercially available mullite fibers (cotton-like state, mullite purity 98%, and fiber diameter 3 to 4 μm) were cut into a length of 2 mm, and 90 g of the cut fibers were then dispersed in 15 liters of water. Afterward, 80 g of methyl cellulose, 200 g of colloidal silica (silica content 20% by weight) and 1 kg of an alumina sol (alumina content 10 to 11% by weight) were added thereto, followed by filtration and vacuum molding to obtain a 100 mm × 100 mm × 70 mm molded article of the fibers. This molded article was heated up to 1650° C. at the temperature rise rate of 150° C./hour and further heated at the same temperature for 4 hours to sinter it. The obtained sintered article contained 95% of mullite. It was porous and had a compressive strength of 25 kg/cm², a bulk density of 0.35 g/cm³ and a porosity of 88%.

Note: Mullite can be represented by $3Al_2O_3 \cdot 2SiO_2$.

REFERENCE EXAMPLE

For the molded articles obtained in Examples 1 to 6 and Comparative Examples 1 to 3, linear shrinkage ratios and heat resistance after heat cycle load were tested. The results are set forth in the following table:

|  | Linear Shrinkage Ratio (%) after Heat Cycle Load | Heat Resistance throughout the heat cycle (°C.) |
| --- | --- | --- |
| Example 1 | 4 | 1850 |
| Example 2 | 2 | 1870 |
| Example 3 | 2 | 1870 |
| Example 4 | 3 | 1870 |
| Example 5 | 4 | 1850 |
| Example 6 | 2 | 1870 |
| Comp. Ex. 1 | 13 | 1700 |
| Comp. Ex. 2 | 15 | 1650 |
| Comp. Ex. 3 | 18 | 1630 |

They were tested by the following procedures.

[Linear shrinkage ratio after heat cycle load]

Each sample was subjected to 20 cycles of a heat cycle load which was composed of heating the sample from room temperature to 1750° C. in 3 hours, maintaining it at the same temperature for 24 hours, and then cooling it to room temperature in 2 hours in a N₂ gas stream. After the passage of the 20 cycles, the linear shrinkage ratio of the sample was measured.

[Heat resistance throughout the heat cycle]

Each sample was maintained in the atmosphere at a predetermined temperature for 4 hours, and after cooling, the linear shrinkage ratio of the sample was measured. The heat resistance was represented by the upper limit of temperatures at which the linear shrinkage ratio was not in excess of 1%.

According to the above-mentioned test results, with regard to the molded articles of the alumina fibers in Comparative Examples 1 to 3, the linear shrinkage ratios after the heat cycle load were as much as 13–18%, deformation was definitely perceived, and the heat resistance was also low, 1630°–1700° C. On the contrary, with regard to the molded articles of the high-purity alumina fibers in Examples 1 to 6 which were prepared by the method of the present invention, the linear shrinkage ratios were extremely low, 2–4%, deformation was not perceived, and the heat resistance was also high, 1850°–1870° C. It is apparent from these results that the molded articles of the high-purity alumina fibers according to the method of the present invention have the high heat resistance. It is also apparent that these molded articles regarding the present invention are materials in which the deformation and the linear shrinkage ratios generated in the heat cycles at the high temperatures are small.

Although the invention has been described with preferred embodiments it is to be understood that variations and modifications may be resorted to as will be apparent to those skilled in the art. Such variations and modifications are to be considered within the purview and the scope of the claims appended hereto.

What is claimed is:

1. A method for preparing molded articles of high-purity alumina fibers having an alumina content of not less than 95 percent by weight, which compirses the stps of:

(a) spinning a spinning solution containing a high-purity alumina fiber precursor as the main component to form precursor fibers, siad spinning solution being a slurry obtained by adding a powder of aluina or an alumina compound which will become alumina by calcination and a spinning auxiliary to a solution formed by dissolving a basic aluminum salt in water or an aqueous solvent, and then adding or not adding a sintering auxiliary thereto;

(b) prefiring these precursor fibers at a temperature of from 400° to 1000° C. for 1 to 120 lminutes to obtain prefired fibers;

(c) dispersing siad prefired fibers in a solvent 20 to 200 times by weight as much as the amount of hte prefired fibers;

(d) removing the used solvent therefrom by filtration or evaporation and molding them; and (e) calcining the resultant molded articles of the prefired fibers at a temperature higher than the prefiring temperature, from 1000° C. to 1900° C.

2. The method for preparing molded articles of high-purity alumina fibers according to claim 1 wherein a molding auxiliary and/or a binder comonent are added to the prefired fiber dispersion formed in step (c).

3. The method for preparing molded articles of high-purity alumina fibers according to claim 1 wherein the solvent of stpe (c) is one solvents selected from the group consisting of water, an alcohol solvent, an aromatic solvent and a ketone solvent.

4. The method for preparing molded articles of high-purity alumina fibers according to claim 2 wherein the molding auxiliary is a water soluble organic compound.

5. The method for preparing molded articles of high-purity alumina fibers according to claim 2 wherein the binder component is an aluminum compound.

6. The method for preparing molded articles of high-purity alumina fibers according to claim 1 wherein the fiber diameter and the fiber length of the prefired fibers are in the ranges of from 4 to 160 μm and from 0.1 to 30 mm, respecitvley.

7. The method for preparing molded articles of high-purity alumina fibers according to claim 1 wherein the rise rate of the calcination temperature is 200° C./hour or less.

* * * * *